United States Patent [19]
Castle

[11] Patent Number: 5,524,670
[45] Date of Patent: Jun. 11, 1996

[54] AUTOMATIC FLOW CONTROL VALVE

[75] Inventor: Robert W. Castle, Pawtucket, R.I.

[73] Assignee: Taco, Inc., Cranston, R.I.

[21] Appl. No.: 328,579

[22] Filed: Oct. 21, 1994

[51] Int. Cl.⁶ ................................................. G05D 7/01
[52] U.S. Cl. ................................................. 137/504
[58] Field of Search ................................................. 137/504

[56] References Cited

U.S. PATENT DOCUMENTS

| | | |
|---|---|---|
| 957,097 | 5/1910 | Restucci . |
| 1,459,939 | 6/1923 | Urtubees . |
| 1,797,118 | 3/1931 | Beach . |
| 2,059,363 | 11/1936 | Kimball . |
| 2,079,915 | 5/1937 | Midyette, Jr. . |
| 3,554,222 | 1/1971 | Kihara et al. . |
| 3,586,036 | 6/1971 | Barnes . |
| 3,590,861 | 7/1971 | Chittenden et al. . |
| 3,752,183 | 8/1973 | Griswold ................................................. 137/504 |
| 3,752,184 | 8/1973 | Griswold ................................................. 137/504 |
| 3,872,884 | 3/1975 | Busdiecker et al. . |
| 4,066,096 | 9/1976 | Lind ................................................. 137/504 |
| 4,074,693 | 2/1978 | Kates . |
| 4,080,993 | 9/1976 | Lind ................................................. 137/504 |
| 4,210,171 | 7/1980 | Rikuta . |
| 4,250,915 | 2/1981 | Rikuta . |
| 4,919,305 | 4/1990 | Podgers . |
| 5,054,516 | 10/1991 | Okerblom ................................................. 137/504 |
| 5,178,324 | 1/1993 | Moesby . |
| 5,230,366 | 7/1993 | Marandi . |
| 5,301,710 | 4/1994 | Marandi . |

FOREIGN PATENT DOCUMENTS 89507 8/1960 Denmark .

Primary Examiner—Stephen M. Hepperle
Attorney, Agent, or Firm—Fish & Richardson

[57] ABSTRACT

An automatic flow control valve for maintaining a predetermined output flow rate in response to a varying pressure differential across the valve has an orifice element, an occluding element and a spring each placed at least partially within a valve housing. The orifice element has a fluid port at a fixed and predetermined distance from an alignment end of the orifice element. The occluding element has an occluding region at a fixed and predetermined position relative to an alignment end of the occluding element. The spring extends along a longitudinal axis of the valve housing and the length of the spring in the absence of fluid flow is predetermined. In use, fluid flows longitudinally between the fluid port and the alignment end of the occluding element. This causes the alignment end of the orifice element to be aligned with one end of the compression spring and the alignment end of the occluding element to be aligned with a second end of the spring. This results in a predetermined alignment of the fluid port with the occluding region. In addition, the occluding element and first orifice element are shaped and positioned to move axially relative to one another in response to a pressure differential across the fluid port of the first orifice element, causing the occluding region to move past the fluid port to vary the occlusion of the fluid port. There results a predetermined relationship between pressure differential and occlusion of the fluid port.

5 Claims, 3 Drawing Sheets

AUTOMATIC FLOW CONTROL VALVE

BACKGROUND

This invention relates to automatic flow control valves that maintain a desired output flow rate in response to a varying pressure differential across the valve.

The output flow rate (Q) of a valve is a function of the effective area (A) of the ports of the valve, the fluid pressure differential across the valve ($\Delta p$), and the shape of the flow path through the valve (s), such that:

$$Q = As \sqrt{\Delta p} \qquad (1)$$

Automatic flow control valves typically maintain a constant flow rate (Q) by modifying the area (A) of the ports inversely to a change in the pressure differential ($\Delta p$) across the valve. For example, the valves may have a fixed-area output port and a set of adjustable input ports. In response to an increase in the pressure differential across the valve, the input ports move relative to an occluding element that partially blocks the ports, and thus reduces their effective area. The dimensions of the valve are carefully controlled to ensure that the occluding element reduces the effective area (A) of the input ports in response to an increase in the pressure differential ($\Delta p$) in a manner to maintain a constant output flow rate.

In one type of automatic flow control valve, described in U.S. Pat. No. 5,054,516 (Okerblom), incorporated by reference, a cup with a set of input ports is placed coaxially inside one end of a hollow valve housing. The cup fits inside a pilot ring that serves as the occluding element. The housing has a fixed-size output port at an opposite end. One end of a spring biases a flange on the cup against a portion of the housing that supports the pilot ring. An opposite end of the spring is connected to an end cap. Prior to use, the load on the spring must be precisely adjusted by twisting the end cap to a predetermined torque.

In use, fluid flows through the input ports on the cup and out from the output port of the valve. As the pressure differential across the valve increases and produces a force on the cup that exceeds the spring preload, the cup begins to move along the housing and inside the pilot ring. The pilot ring begins to occlude the input ports on the cup and reduces the effective area of the input ports in a manner to maintain a constant output flow rate.

Prior to use, the constant output flow rate of the valve can be adjusted by nesting the cup within a slightly larger cup, also having a set of input ports. The amount of overlap between the set of ports on each cup determines the maximum area (A) of the input ports that will be exposed to fluid flow. The constant flow rate (Q) of the valve can therefore be adjusted by rotating the cups relative to one another to vary the amount of overlap between the sets of ports.

In another design, described in U.S. Pat. Nos. 3,752,184 and 3,752,183 (Griswold), the valve housing is a cartridge formed from a sheet-metal cylinder. Each end of the cylinder is bent in radially, to provide an aperture for fluid flow that is smaller than the cylinder radius. A cup having a set of input ports distributed on its side surface extends out from one aperture of the cartridge. The cup is biased against fluid flow by a spring placed longitudinally within the cartridge. The valve attempts to maintain a constant output flow rate in the manner described above, with the bent-over end of the cartridge acting as the occluding element and partially blocking the input ports on the cup as the cup slides into the cartridge in response to an increase in the pressure differential across the valve.

In both the Okerblom and Griswold valves, there are difficulties in achieving accurate and repeatable flow characteristics. In particular, it is difficult to control the pressure differential at which the -occluding element begins to block the input ports of the valve. As a result, the effective input port area of the valve may not vary in the proper manner with the pressure differential across the valve, causing an unreliable output flow rate.

In the Griswold valve, the pressure at which occlusion begins depends on the length of the cartridge housing, because one end of the cartridge serves as the occluding element. This length is difficult to control during manufacturing because the cartridge is generally manufactured by bending the ends of a metal cylinder to form the aperture at each of its ends. As a result, it becomes difficult to precisely control the pressure at which the cup will begin to move into the cartridge and the end of the cartridge occlude the input ports.

In the Okerblom valve, the pressure differential at which occlusion begins is sensitive to the preload exerted by the spring against the cup. As a result, the spring preload must be precisely adjusted prior to use.

Another automatic flow control valve, described in U.S. Pat. No. 4,074,693 (Kates), contains a complex fluid path which is partially transverse to the longitudinal axis of the valve.

SUMMARY OF THE INVENTION

The invention provides an automatic flow control valve which has an occluding element that is separate from the valve housing or cartridge. A spring is placed between an alignment end of the occluding element and an orifice element that has input fluid ports. An occluding region on the occluding element blocks the fluid ports as the orifice element moves relative to the occluding element in response to the fluid pressure differential across the valve. The position of the occluding region relative to the alignment end of the occluding element thus partially controls the position of the occluding region relative to the fluid ports, and governs the relationship between the fluid pressure differential across the valve and the occlusion of the fluid ports. Because this relative position is fixed, and predetermined to within a very small tolerance, the valve controls the fluid flow both precisely and in a repeatable manner.

In one aspect, generally, the invention features an automatic flow control valve for maintaining a predetermined output flow rate in response to a varying pressure differential across the valve. The valve has an orifice element, an occluding element, and a compression spring that are each placed at least partially within the valve housing. The fluid port of the valve is placed on the orifice element at a fixed and predetermined distance from an alignment end of the orifice element. The occluding region of the occluding element is at a fixed and predetermined position relative to an alignment end of the occluding element. The spring extends along the longitudinal axis of the housing, and the length of the spring in the absence of fluid flow is also predetermined.

In use, fluid flows longitudinally between the fluid port and the alignment end of the occluding element. As a result, the alignment end of the orifice element is aligned with one end of the compression spring and the alignment end of the occluding element is aligned with a second end of the spring.

As a result, there is a predetermined alignment of the fluid port with the occluding region of the occluding element.

The occluding element and first orifice element are shaped and positioned to move axially relative to one another in response to a pressure differential across the fluid port of the first orifice element. This causes the occluding region to move past the fluid port to vary the occlusion of the fluid port, producing a predetermined relationship between pressure differential and occlusion of the fluid port.

The valve housing may include a cartridge formed of a sheet metal cylinder that is bent in radially at each end. Opposite bent ends of the cartridge can be placed around generally planar regions of the alignment end of the orifice element and the occluding element.

The occluding element may include a sleeve that extends longitudinally at least partially inside the housing. One end of the sleeve serves as the occluding region, while the opposite end provides the alignment end of the sleeve. The alignment end of the sleeve may include a radially extending flange that abuts the second end of the spring.

The orifice element may include a cup placed at one longitudinal end of the housing. One or more fluid ports may be arranged on a cylindrical wall of the cup. The alignment end of the cup may include a radially extending flange that abuts the first end of the spring. When the occluding element includes a sleeve disposed longitudinally at least partially within said housing, the end of the sleeve serving as the occluding region may extend at least partially into the interior of the cup. In use, fluid flows through the fluid port on the cup to an interior of the cup. The fluid then flows along the longitudinal axis of the housing through an inside of the sleeve and the spring in the housing.

In order to control the output flow rate of the valve, the cup is nested within a second orifice element, typically a second cup. The second cup has a fluid port on its cylindrical wall. An overlap between the fluid port on the first cup and the fluid port on the second cup defines an effective fluid port through which fluid flows into the valve. The second cup is generally nested within the first cup in a tight coaxial fit so that a rotation of the second cup relative to the first cup controls an area of the effective fluid port. The cylindrical walls of the first cup and the second cup may each have markings such that a position of the markings on the first cup relative to the markings on the second cup provide an indication of the output flow rate achieved by the effective fluid port. This output flow rate may be chosen to be constant.

The performance of the valve depends on the precise specification of the dimensions of the cup, sleeve and spring arrangement. In general, to ensure a repeatable and precise valve performance, the position of the occluding region relative to the alignment end of the occluding element may be predetermined to within 0.005 inches; the position of the fluid port relative to the alignment end of the first orifice element may be predetermined to within 0.002 inches; and the separation between the first end and the second end of the compression spring in the absence of fluid flow may be predetermined to within 0.030 inches. These tolerances are easily met by typical manufacturing processes. As a result, the larger variations expected in the spring preload and cartridge length (which are difficult to manufacture to precise standards) will not significantly affect valve performance.

Other features and advantages of the invention will be apparent form the following description of the preferred embodiments and from the claims.

DESCRIPTION OF THE PREFERRED EMBODIMENTS

Figure 1:
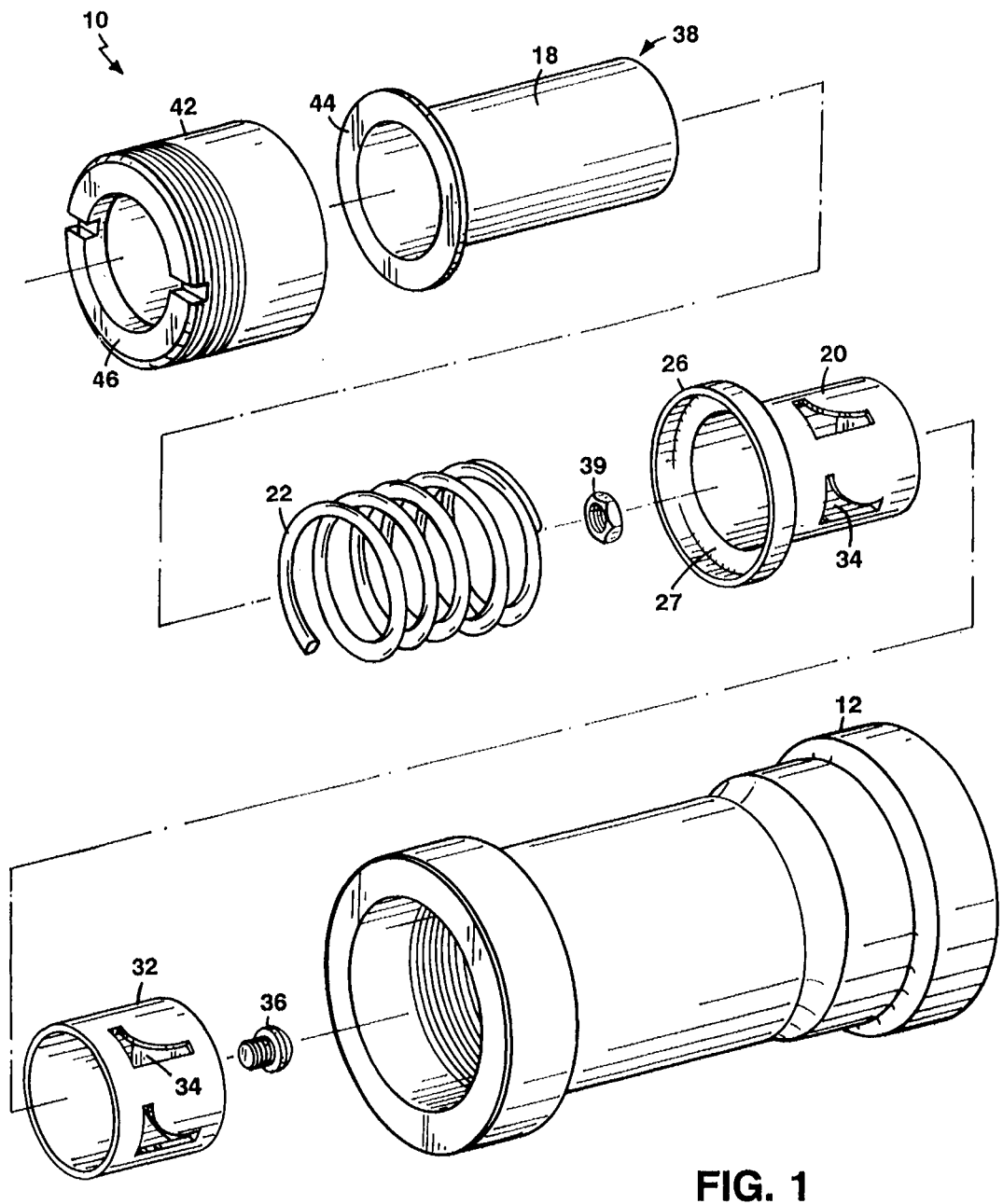
FIG. 1 is an exploded perspective view of an automatic flow control valve, according to the invention.
Figure 2:
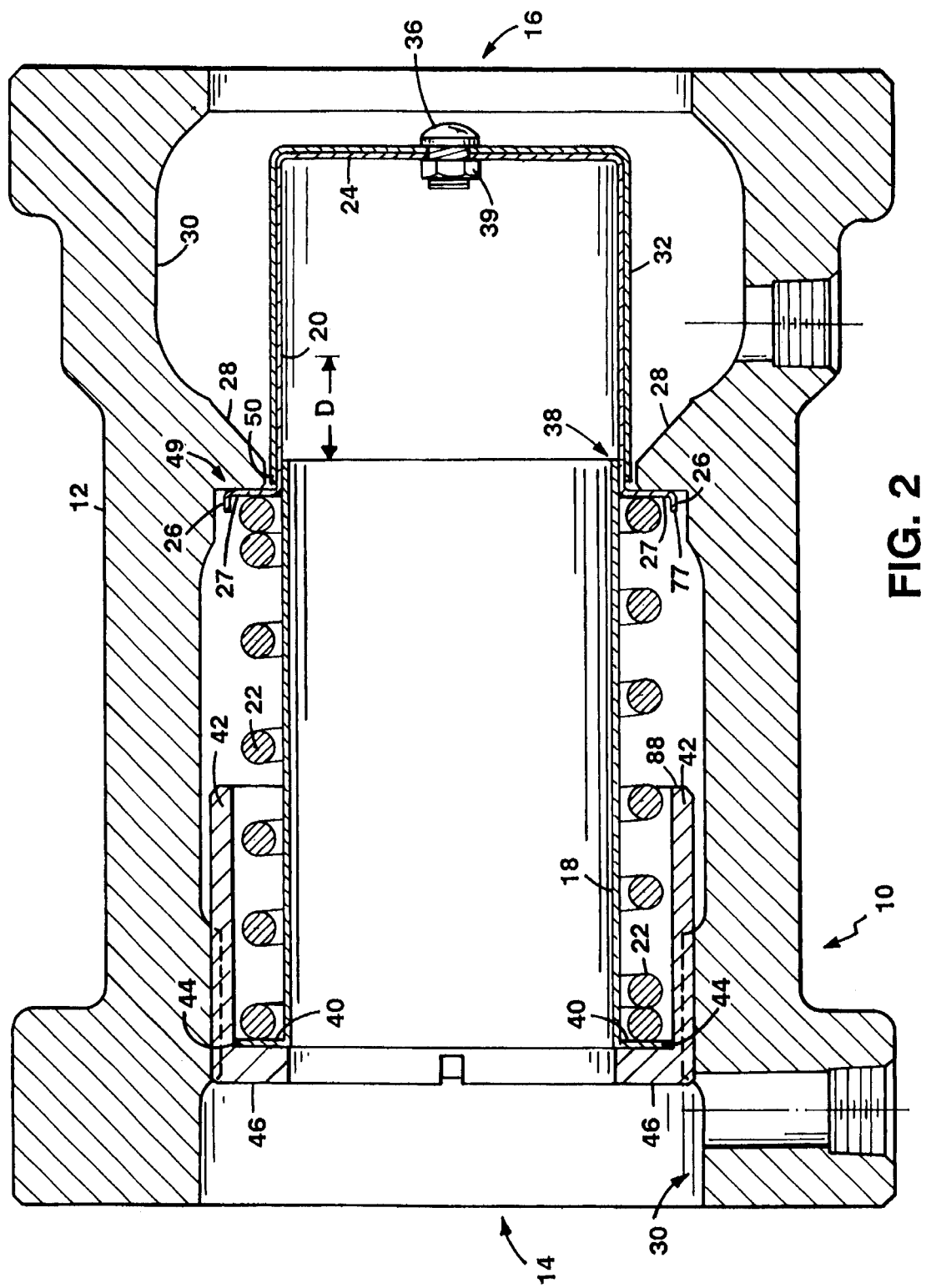
FIG. 2 is a cross-sectional side view of the automatic flow control valve of FIG. 1.

Referring to FIGS. 1 and 2, an automatic flow control valve 10 has a hollow valve housing 12 with an aperture 14, 16 at each end for allowing fluid to flow along a longitudinal axis of the housing. Internal components of the housing, including an occluding element 18, an orifice element 20, and a compression spring 22, regulate the fluid flow through the valve, as described in detail below.

The orifice element 20 is provided by a cup having a crown 24 at one end and an outer flange 26 at an opposite end. A surface 27 of the flange 26 facing aperture 14 serves as an alignment end of the cup. The cup is placed inside the housing with the crown 24 of the cup facing aperture 16 of the housing. When the cup is maximally displaced toward aperture 16, an opposite surface of the outer flange 26 rests against a ring-like protrusion 28 on the inside surface 30 of the housing.

The cup is nested inside a second orifice element or cup 32 with a slightly larger diameter in a tight coaxial fit. Each cup has a set of input fluid ports 34 on its cylindrical wall that are placed at a predetermined distance from the alignment end of the cup. This distance is typically fixed, and specified to within 0.002 inches.

Prior to use, the nested cups are rotated relative to one another to adjust the amount of overlap between the input ports on each cup, as described in more detail below. The cups are then held together by a bolt 36 inserted in a nut 39 through a hole in the crowns of the cups.

The occluding element 18 is a generally cylindrical sleeve that extends along the longitudinal axis of the housing. One end of the sleeve 18 forms an occluding region 38 that extends partially inside the smaller cup 20. A surface 40 of flange 44 on the opposite end of the sleeve serves as an alignment end of the sleeve. An opposite surface of the flange 44 is placed against a base 46 of a small metal cylinder 42 fixed to the valve housing. The length of the sleeve is fixed and tightly controlled, i.e. the distance of the occluding region from the alignment end of the sleeve is predetermined, generally to within 0.005 inches.

The spring 22 is located around the sleeve, between the sleeve and the cylinder 42, and extends from the alignment end (the surface 40 of flange 44) of the sleeve at a first end to the alignment end (surface 27 of the outer flange 26) of the cup 20 at an opposite, second end. The spring has a preset length in the absence of fluid flow in the valve, which is typically specified to within 0.030 inches.

In operation, fluid flows through aperture 16 of the valve, against the crown of the cups and through the fluid ports. The fluid then flows longitudinally through the valve, between the fluid ports and the alignment end of the sleeve, and out through aperture 14 of the valve. The pressure differential across the valve causes the alignment end (surface 27 of the outer flange 26) of the smaller cup to rest against the second end of the spring, and causes the first end of the spring to rest firmly against the alignment end (surface 40 of flange 44) of the sleeve. Because the dimensions of the spring, cup and sleeve are predetermined, the fluid ports on the cup are placed at a predetermined distance D from the occluding region of the sleeve.

When the pressure differential increases above the pressure exerted by the spring against the cups, the cups move longitudinally relative to the sleeve and compress the spring. The cups continue to move until the pressure exerted by the spring exactly counteracts the pressure differential across the valve.

When the pressure differential increases above a minimum value defined by the spring load and the distance D, the cups will move far enough to bring the input ports on the cups adjacent the occluding region of the sleeve. As a result, the occluding region of the sleeve will partially block the input ports and reduce the effective area through which fluid may flow into the valve. The shape of the input ports ensures that the sleeve will reduce the effective area (A) of the input ports in a manner to exactly maintain a predetermined output flow rate (Q) at the higher pressure differential Δp, according to Equation (1). Typically, the predetermined output rate is chosen to be a constant.

Figure 3:
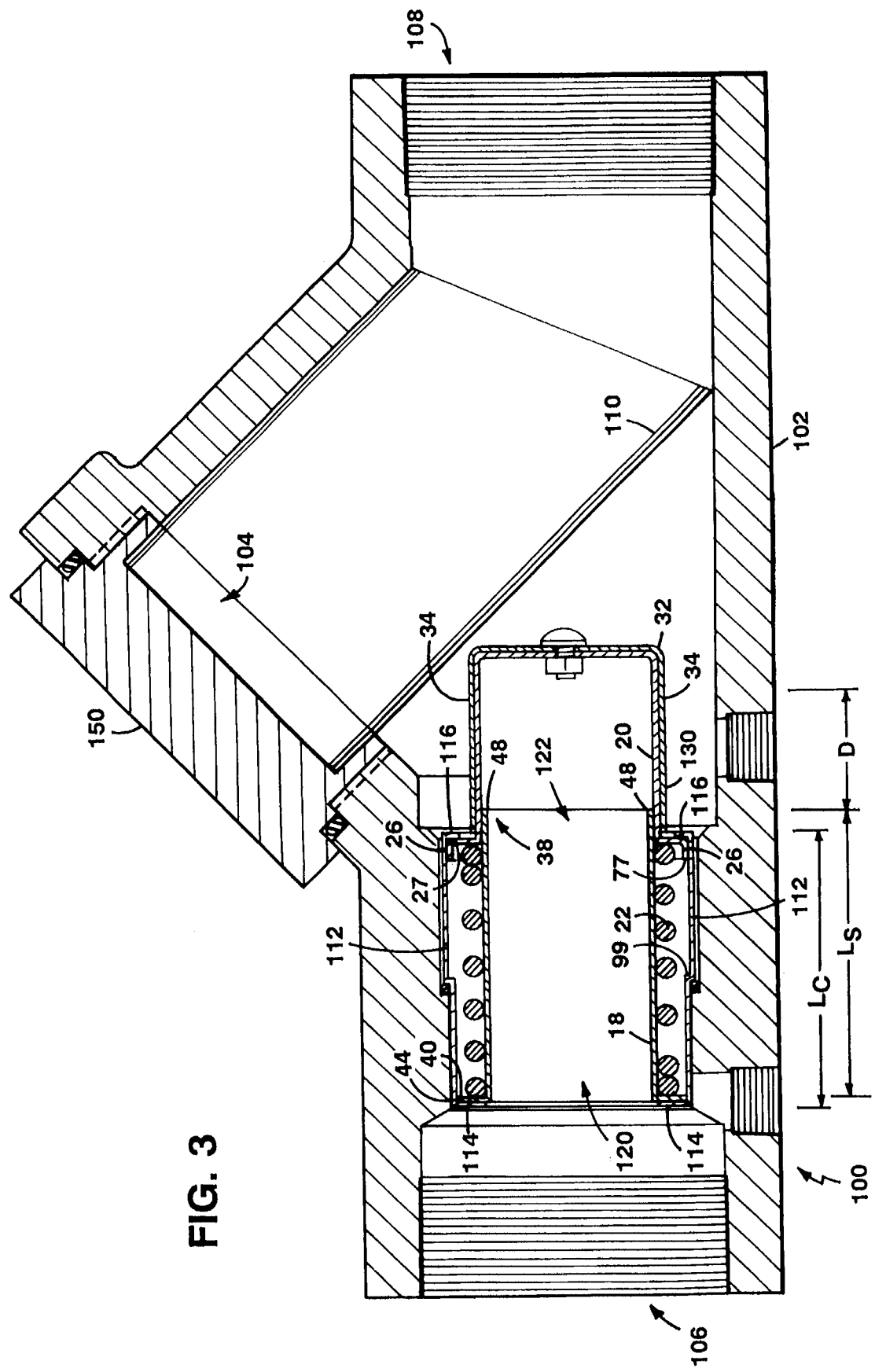
FIG. 3 is a cross-sectional side view of another automatic flow control valve.

At a maximum operating pressure differential, the cups will have moved far enough such that surface 77 of orifice element 20 is stopped in motion by surface 88 of sleeve cylinder 42 (FIG. 2) or surface 99 of cartridge 112 (FIG. 3). When this occurs, a constant area orifice exists which permits flow to occur at a rate above the fixed, controlled setting of the automatic flow control valve. Thus, above the maximum pressure differential, the valve can no longer modify the effective area of the ports in response to changes in the pressure differential to maintain a constant flow rate.

If the fluid flow then decreases to bring the pressure differential below the maximum, the cups will move to decompress the spring. The cups will continue to move until the spring pressure balances the new pressure differential. At the new position, the input ports will be partially uncovered to produce a larger effective area (A) that maintains the constant output flow rate (Q).

The valve thus provides a precise relationship between the pressure differential across the valve and the occlusion of the input fluid ports of the valve. The dimensions that control this relationship include the location of the fluid ports relative to the alignment end of the cups, the position of the cups relative to the occluding region of the sleeve, the distance between the alignment end and the occluding region of the sleeve and the length and possible preload of the spring. The valve facilitates a tight control of the relationship between the pressure differential and the effective area by providing a fixed length sleeve that can be easily manufactured to within a very small variability, e.g., to within 0.005 inches. This allows for a greater tolerance in the spring parameters, which are more difficult to adjust precisely.

As a result, the valve is able to maintain a constant output flow rate to within at least 5%, over a pressure differential across the valve ranging from 3 to 33 psi.

The output flow rate of the valve is adjusted by rotating the cups relative to one another to control the amount of overlap between the input ports on the cups. At maximum overlap, a maximum output flow rate is achieved. As the cups are rotated to progressively decrease the exposed area of the input ports, the output flow rate of the valve is decreased.

As described in detail in the Okerblom patent, the surfaces of the cups may be marked to indicate the constant output flow rate achieved by a variety of relative positions of the cups. For example, the outer flange 26 of the smaller cup may have a set of lines extending inward from the edge 49 of the flange. Each line is marked with a value of the output flow rate. The larger cup may have a single vertical line near its bottom edge 50. To choose a constant output flow rate, the outer cup is rotated to align the vertical line with the line on the smaller cup that corresponds to the desired flow rate.

The cups may also be provided with an external adjustment mechanism that allows the cups to be rotated relative to one another from outside the housing after the valve is assembled, as described in the Okerblom patent.

Referring to FIG. 3, another automatic flow control 100 valve has a Y-shaped housing 102 with three apertures 104, 106, 108. Aperture 104 is closed by cap 150 which may be removed to clean the strainer. A strainer 110 is placed in one aperture 104, while a cup and sleeve arrangement similar to that described above is placed between opposite apertures 106, 108 to control the rate of fluid flow through the valve. The cups 20, 32, sleeve 18, and spring 22 are arranged in the same manner described above, except that a generally cylindrical cartridge 112 replaces support 42 and protrusion 28 of the housing (FIG. 1).

The cartridge is formed from sheet metal rolled into cylinder, with indented ends that form lips 114, 116 surrounding apertures 120, 122 at opposite ends of the cartridge. The smaller cup 20 fits inside one end of the cartridge, with the outer flange 26 of the cup held against a lip 116 of the aperture 122 when the cup is maximally displaced from aperture 106 of the housing. The outer flange 44 of the sleeve is similarly held against lip 114 at the opposite end of the cartridge.

The valve operates in the same manner described above, with fluid flowing through the input ports 34 on the cups 20, 32 and out from aperture 106 of the housing. During fluid flow, the alignment end (surface 27 outer flange 26) of the cup 20 rests against one end of the spring 22, and the opposite end of the spring rests against the alignment end (surface 40 of flange 44) of the sleeve 18. The fluid ports on the cup are thus aligned at a predetermined distance from the occluding region 38 of the sleeve.

Some separation is provided between the lip 116 of the cartridge and an outer surface 130 of the larger cup 32, so that the cartridge itself does not block the input ports of the cups as the cups slide relative to the sleeve. The occluding region 38 of the sleeve alone occludes the input ports, as described above.

In some designs, the length $L_c$ of the cartridge may limit the length of the spring in the absence of fluid flow through the valve (e.g., when the spring is long and has no preload, one end of the spring may press the outer flange 26 of the cup 20 against the lip 116 of the cartridge). In this case, the cartridge length (instead of the spring length) partially controls the relationship between the pressure differential and the effective fluid port area achieved by the valve. The other controlling dimensions include the length $L_s$ of the sleeve (controlling the distance between the alignment end and the occluding region of the sleeve) and the position of the ports relative to the alignment end of the cups. Both these dimensions can be tightly controlled, and thus permit a greater tolerance in the length of the cartridge, which is difficult to manufacture to exact standards. For example, when the length of the sleeve is specified to within 0.005 inches, the length of the cartridge may vary by up to 0.03 inches.

Other embodiments are within the following claims. For example, the sleeve may be placed outside the cup. In addition, the direction of fluid flow through the valve may be reversed and the cup held fixed. In this case, the sleeve would move relative to the cup to selectively block ports on the cup. Alternatively, the input ports may be moved from the cups to the sleeve.

What is claimed is:

1. An automatic flow control valve for maintaining a predetermined output flow rate in response to a varying pressure differential across the valve, comprising a hollow housing for containing fluid flow along a longitudinal axis;

a compression spring disposed at least partially within the housing, the compression spring extending along the longitudinal axis and having first and second ends, a separation between the first end and the second end in the absence of fluid flow being predetermined;

a first orifice element disposed at least partially inside the housing, the first orifice element having an alignment end and a fluid port through which fluid flows during operation of the valve, the alignment end being configured to be aligned, when fluid is flowing through the valve, with the first end of the compression spring, the position of the fluid port relative to the alignment end being fixed and predetermined;

an occluding element disposed at least partially within the housing, the occluding element having an alignment end and an occluding region, the alignment end being configured to be aligned, when fluid is flowing through the valve, with the second end of the compression spring, the position of the occluding region relative to the alignment end being fixed and predetermined;

the occluding element, first orifice element, and compression spring being configured so that fluid flows longitudinally between the fluid port and the alignment end of the occluding element;

the occluding element and first orifice element being shaped and positioned to move axially relative to one another in response to a pressure differential across the fluid port of the first orifice element, and thereby to move the occluding region past the fluid port to vary the occlusion of the fluid port;

the housing, first orifice element, and occluding element being configured so that, when fluid flows through the valve and creates a pressure difference across the fluid port, and the first end of the compression spring is aligned with the alignment end of the first orifice element, and the second end of the compression spring is aligned with the alignment end of the occluding element, there is thereby a predetermined alignment of the fluid port with the occluding region, and a predetermined relationship between pressure differential and occlusion of the fluid port, wherein said housing comprises a cartridge formed of a sheet metal disposed in a generally cylindrical shape, said sheet metal being bent in radially at each end of the cartridge.

2. The valve of claim 1 wherein the alignment end of the first orifice element has a generally planar region, one bent end of said cartridge being bent around the generally planar region of the alignment end of said first orifice element.

3. The valve of claim 1 wherein the alignment end of the occluding element has a generally planar region, one bent end of said cartridge being bent around the generally planar region of the alignment end of the occluding element.

4. An automatic flow control valve for maintaining a predetermined output flow rate in response to a varying pressure differential across the valve, comprising a hollow housing for containing fluid flow along a longitudinal axis;

a compression spring disposed at least partially within the housing, the compression spring extending along the longitudinal axis and having first and second ends, a separation between the first end and the second end in the absence of fluid flow being predetermined;

a first orifice element disposed at least partially inside the housing, the first orifice element having an alignment end and a fluid port through which fluid flows during operation of the valve, the alignment end being configured to be aligned, when fluid is flowing through the valve, with the first end of the compression spring, the position of the fluid port relative to the alignment end being fixed and predetermined;

an occluding element disposed at least partially within the housing, the occluding element having an alignment end and an occluding region, the alignment end being configured to be aligned, when fluid is flowing through the valve, with the second end of the compression spring, the position of the occluding region relative to the alignment end being fixed and predetermined;

the occluding element, first orifice element, and compression spring being configured so that fluid flows longitudinally between the fluid port and the alignment end of the occluding element;

the occluding element and first orifice element being shaped and positioned to move axially relative to one another in response to a pressure differential across the fluid port of the first orifice element, and thereby to move the occluding region past the fluid port to vary the occlusion of the fluid port;

the housing, first orifice element, and occluding element being configured so that, when fluid flows through the valve and creates a pressure difference across the fluid port, and the first end of the compression spring is aligned with the alignment end of the first orifice element, and the second end of the compression spring is aligned with the alignment end of the occluding element, there is thereby a predetermined alignment of the fluid port with the occluding region, and a predetermined relationship between pressure differential and occlusion of the fluid port, wherein the orifice element comprises a cup disposed at one longitudinal end of the housing, the fluid port being disposed on a cylindrical wall of the cup, and further comprising a second orifice element, the second orifice element comprising a second cup, the first cup being nested within the second cup, the second cup having a fluid port disposed on a cylindrical wall of the second cup, an overlap between the fluid port on the first cup and the fluid port on the second cup defining an effective fluid port through which fluid flows into the valve.

5. The valve of claim 4 wherein the first cup is nested within the second cup in a tight coaxial fit, a rotation of the second cup relative to the first cup controlling an area of the effective fluid port.

* * * * *